United States Patent [19]

Dierschke

[11] 3,711,789

[45] Jan. 16, 1973

[54] DIODE ARRAY ASSEMBLY FOR DIODE PUMPED LASERS

[75] Inventor: Eugene Gustav Dierschke, Dallas, Tex.

[73] Assignee: Texas Instruments Incorporated, Dallas, Tex.

[22] Filed: Nov. 18, 1970

[21] Appl. No.: 90,596

[52] U.S. Cl..........331/94.5 P, 313/108 D, 317/234 R

[51] Int. Cl...................................................H01s 3/00

[58] Field of Search .............331/94.5; 317/234, 235; 313/108 D

[56] References Cited

UNITED STATES PATENTS

| | | | |
|---|---|---|---|
| 3,396,344 | 8/1968 | Broom | 331/94.5 |
| 2,684,457 | 7/1954 | Lingel | 317/235 |
| 3,274,453 | 9/1966 | Sikina | 317/235 |
| 3,351,698 | 11/1967 | Marinace | 331/94.5 |
| 3,471,923 | 10/1969 | Lamorte et al. | 29/572 |
| 3,538,455 | 11/1970 | Florio | 331/94.5 |
| 3,555,452 | 1/1971 | Nielson et al | 331/94.5 |
| 3,523,045 | 8/1970 | Suzuki et al. | 148/33.1 |

OTHER PUBLICATIONS

Ochs et al: "Injection Luminescent Pumping of a CaF :Dg + Laser," Proc. IEEE, vol. 52, pp. 713–714, June, 1964

Allen et al.: "Continuous Operation of a YAlG:Nd Laser by Injection Luminescent Pumping," App. Phys. Lett., vol. 14 pp. 188–190, 3/15/69

*Primary Examiner*—Ronald L. Wibert

*Assistant Examiner*—Edward S. Bauer

*Attorney*—James O. Dixon, Andrew M. Hassell, Harold Levine, Melvin Sharp and Rene E. Grossman

[57] ABSTRACT

A diode array assembly having excellent thermal characteristics for the removal of heat from the diodes permits high packing density of diodes around a laser rod and requires only one or more diodes to be committed to a header of the assembly. The assembly is comprised of a thermally conductive monolithic support member having coolant passage formed through it. A plurality of thermally conductive headers are bonded on a surface of the support member to provide good thermal conduction from the headers to the support member. One or more light emitting diodes are mounted on each header such that the diodes form a substantially straight line along the assembly. Several such modular assemblies are then mounted around the laser rod.

18 Claims, 7 Drawing Figures

Figures 1, 1A, 2, 2A:
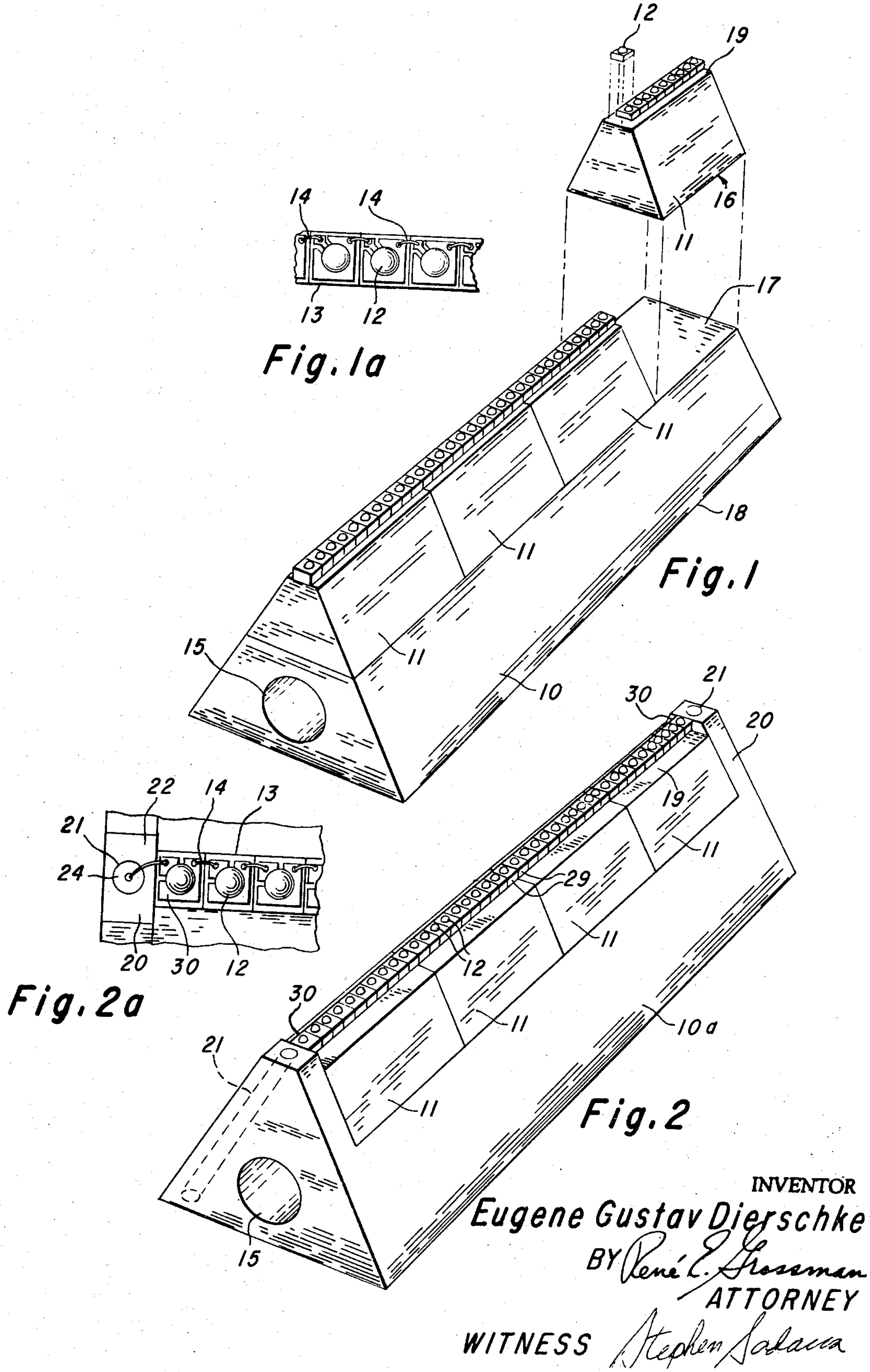

INVENTOR
Eugene Gustav Dierschke
BY René E. Grossman
ATTORNEY
WITNESS Stephen Salaca

DIODE ARRAY ASSEMBLY FOR DIODE PUMPED LASERS

This invention relates to assemblies for light-emitting members. This invention further relates to light-emitting diode array assemblies for diode pumped lasers and, in particular, to such assemblies having means for removing heat generated by such light-emitting diodes.

At the present time, a number of different lasers are known and in use. These include crystalline lasers, liquid lasers, glass lasers, gas lasers, and semiconductor lasers. Because semiconductor light-emitting diodes can be fabricated to generate light energy having a wavelength within a narrow bandwidth, it has been found preferable to excite certain lasers with such light-emitting diodes. Diode pumped lasers have certain advantages over other lasers in that they include solid-state components and are therefore relatively uncomplicated to design, construct and operate.

The amount of excitation energy generated by each light-emitting diode is relatively small, and therefore a relatively large number of diodes are required to be packed around the laser rod. In addition, the many diodes generate undesirable heat energy as well as the desired light energy. Such heat can affect the operation of the diodes or destroy the diodes themselves. Means for removing the unwanted heat energy generated by the light-emitting diodes is therefore necessary to remove such generated heat from the diodes.

It is therefore an object of the present invention to provide a light-emitting member array assembly having excellent thermal characteristics for the removal of heat from the light-emitting members, and, in particular, where such light-emitting members are light-emitting semiconductor diodes.

Another object of the invention is to provide a light-emitting diode array assembly which permits high packing density of diodes around a laser rod.

A further object of the invention is to provide a diode array assembly having both excellent thermal characteristics and means for permitting only one or more diodes to be committed to a header of the assembly.

One header assembly suggested to accomplish similar objectives is disclosed in copending patent application Ser. No. 880,877, filed Nov. 28, 1969, and assigned to the assignee of the present invention. One embodiment of the invention disclosed in such copending application includes a plurality of header sections each having one or more light-emitting members affixed thereto. The sections are positioned adjacent each other along a line and insulated from each other by respective layers of electrically insulating material. The assemblies are retained in a set by a bolt which extends through holes formed in each section of the assembly. The bolt is comprised of a thermally conductive material and has a coolant passageway formed through it for the flow of a fluid coolant although the bolt is not in integral relation with the header sections. A particular advantage of that header assembly is that only one or a few diodes need be committed to any one section of the assembly. Disclosed herein is a modular header assembly which has the same advantage of allowing one or a few light-emitting members to be committed to a single header section, yet has superior thermal characteristics. That is, thermal conduction between the diodes and a stream of fluid coolant passing through a coolant passage of the assembly of the present invention provides superior heat dissipation.

The improvement is provided in accordance with the subject invention by a modular diode array assembly comprised of a unitary, one piece, monolithic thermally conductive support member having a coolant passage formed through it. A plurality of thermally conductive headers are mounted on a surface of the support member so that the headers are joined securely such as by bonding to the support member to provide good thermal conduction from the headers to the support member. In one embodiment of the invention an adherent layer of solder is provided between the headers and the surface of the support member to provide this heat exchanging relationship. One or more light-emitting diodes are mounted on each header so that the number of diodes committed to any particular header is controlled in an optimal fashion. In one embodiment, the light-emitting diodes are mounted in a single substantially straight line on the headers, and the headers are mounted in a single substantially straight line on the support member such that the light-emitting diodes of all of the headers are in a single substantially straight line. In a further embodiment, at least a portion of the coolant passage extends through the support member in a substantially straight line parallel to the substantially straight line formed by the light-emitting members to provide maximum heat exchange between the diodes and the stream of fluid coolant. Several such modular header assemblies are then positioned around a laser rod the length of which is parallel to each of the substantially straight lines formed by the light-emitting diodes of the respective assemblies to provide a diode pumped laser. In still another embodiment, the diode pumped laser includes reflecting members having at least one reflecting surface positioned around the laser rod, the number of such reflecting members being equal to the number of header assemblies positioned around the laser rod. In this structure, light beams transmitted by the light-emitting diodes through the laser rod are reflected by the reflecting surfaces back through the laser rod.

Figures 3, 4, 5:
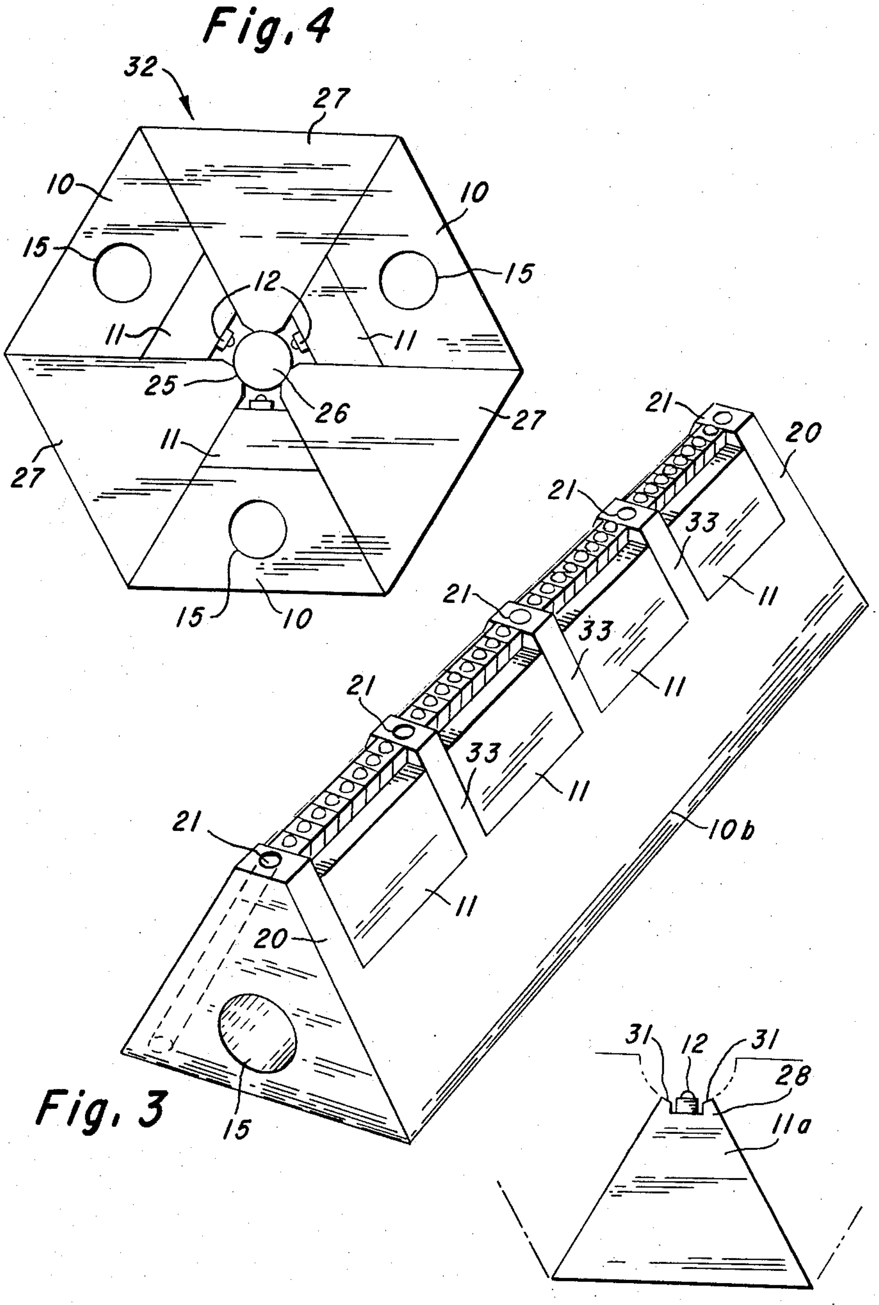

Further objects and advantages of the invention will be apparent from the following detailed description and claims and from the accompanying drawings illustrative of the invention wherein:

FIG. 1 is an isometric drawing illustrating generally the modular diode array assembly of the invention;

FIG. 1*a* is a top view of a portion of a row of diodes illustrating serial connection of such diodes;

FIGS. 2 and 2*a* are an isometric and top view, respectively, of an embodiment of the invention including connector means for connecting the diodes of a header assembly in series means for applying a potential to the series;

FIG. 3 is an isometric drawing illustrating an embodiment of the invention including separate connector means for selectively connecting groups of the diodes of a header assembly in series and applying potentials to each of such groups;

FIG. 4 is an end view of a complete laser including three modular header assemblies and three members having reflective surfaces positioned around a laser rod; and FIG. 5 is an end view of an embodiment of one header assembly for a laser including reflecting surfaces formed on the same surface upon which the diodes are mounted to provide further efficiency in the utilization of the light energy generated by the light-emitting diodes.

Referring then to the drawings, illustrated generally in FIG. 1 is a modular diode array assembly in accordance with the invention. The assembly is comprised of a solid, unitary, monolithic, one piece, thermally conductive support member 10 having coolant passage 15 formed through it. A plurality of thermally conductive headers 11 are mounted, such as by bonding on surface 17 of support member 10 to provide good thermal conduction from headers 11 to support member 10. One or more light-emitting members 12, such as light-emitting semiconductor diodes, are mounted on headers 11.

In the embodiment illustrated, both support member 10 and headers 11 are in the shape of trapezoidal prisms. The trapezoidally shaped headers 11 are complementary to the truncated trapezoidally shaped support member 10 which when joined form a single trapezoidally shaped member. Lower bases 16 of headers 11 are bonded to surface 17 forming the upper base of support member 10. Light-emitting members 12 are mounted on upper base 19 of headers 11.

In one embodiment, both headers 11 and support member 10 are comprised of materials which are electrically conductive as well as thermally conductive, headers 11 being comprised of copper and support member 10 being comprised of brass. The electrically conductive characteristics of these materials are utilized in further embodiments of the invention whereby headers 11 and support member 10 are utilized as a conductor for applying one polarity of a potential to light-emitting members 12. In such further embodiment, illustrated in FIG. 1*a*, insulating submounts 13 are provided to electrically insulate the diodes from the conductor header.

The embodiment illustrated in FIG. 1*a* includes means 14 for electrically connecting the light-emitting members in series.

Again referring to FIG. 1, thermally conductive headers 11 are mounted on surface 17 of support member 10 so that headers 11 are in thermal contact with support member 10 to provide good thermal (and electrical) conduction between headers 11 and support member 10. This is achieved in accordance with a preferred embodiment of the invention by providing an adherent layer of solder, such as gold solder, to bond together surface 16 of headers 11 and surface 17 of support member 10 to establish an heat exchanging relationship between these members.

The embodiment illustrated in FIG. 2 is similar to the structure of FIG. 1 but further includes extensions 20 formed as part of the monolithic structure of support member **10*a*. Passages 21 extending through support member 10*a* including extensions 20** provide conduit means for running electrical connectors to light-emitting members 12. As illustrated in FIG. 2*a*, connector 22 is comprised of an electrically conductive material such as copper extending through connector passageway 21. Means 24 comprised of an electrically insulating material such as plastic, epoxy, insulating resins and the like extends through connector passageway 21 surrounding connector 22, thereby insulating connector 22 from support member **10*a*. Again, means 14 is provided for electrically connecting at least some of the light-emitting members in series and connector 22 is utilized to connect the light-emitting member at one end of the series. The light-emitting member at the other end of the series is connected to a connector at the other end of the support member or to header 11 or support member 10*a* when fabricated from an electrically conductive material. Thus, in the structure of FIG. 2 having two end connector conduit passages 21, light-emitting members 12 of such embodiment are either connected in a single series with end diodes 30 connected to their respective end connectors 22, or in another embodiment, two separate series of light-emitting members are formed whereby end diodes 30 are connected to one polarity potential via connectors 22 in conduit passages 21 and center diodes 29 are connected directly to their respective headers 11 (headers 11 and support member 10*a* being comprised of electrically conductive material and being integral relation such that there is good electrical conductivity between such headers and support member 10*a***) to provide another potential to such center diodes thereby completing the series.

Further subdivision can be made whereby additional extensions 33 having connector passageways 21 are provided on support member **10*b*** between various ones of the headers to provide further connectors and more groups of series-connected diodes as illustrated in FIG. 3.

A laser, as illustrated in FIG. 4, is comprised of a plurality of the completed modular diode array assemblies positioned around laser rod 26. The embodiment of FIG. 4 includes reflecting members 27, each having at least one reflecting surface 25 positioned around laser rod 26. The number of such reflecting members 27 is equal to the number of modular diode array assemblies positioned around laser rod 26 (three of each are shown in the embodiment of FIG. 4). Reflecting surfaces 25 are positioned in relation to the header assemblies so that a reflecting surface 25 is directly opposite each row of light-emitting members 12 whereby light being transmitted by light-emitting members 12 through laser rod 26 is reflected by such opposite reflecting surface 25 back through laser rod 26. As previously mentioned with respect to FIG. 1, in one embodiment of the header assembly, one or more light-emitting members are mounted in a single substantially straight line on headers 11, and headers 11 are mounted in a single substantially straight line on support member 10 such that light-emitting members 12 of headers 11 are in a single substantially straight line. In laser 32 of FIG. 4, such header assemblies are positioned around laser rod 26 so that the length of laser rod 26 is parallel to each of the substantially straight lines formed by light-emitting members 12 of their respective assemblies.

In the use of laser 32, light-emitting members 12 of the header assemblies are energized by connecting them to suitable sources of electrical potential. This may be accomplished either on an individual basis or by forming either parallel or series connections. When forming series connections, all light-emitting members of a header assembly are connected in series as described with respect to FIGS. 1 and 1*a* or 2 and 2*a* or in groups as described with respect to FIGS. 2 and 2*a* or 3. Upon energization, light-emitting members 12 excite or pump laser 32 into a laser beam. During this operation, heat is removed from members 12 by passing a fluid coolant such as isopropol alcohol, water, oil or nitrogen gas through passageways 15 formed in support members 10. The temperature of the coolant may be further reduced by passing it through dry ice ($CO_2$).

By way of example, assume that laser rod 26 is formed from the material known as neodymium doped yttrium aluminum garnet (Nd:YAG). In such a case, light-emitting members 12 are preferably light-emitting semiconductor diodes similar in construction to the type sold by Texas Instruments Incorporated as a part of the product identified as TI XL09 or are preferably comprised of gallium arsenide phosphide. Diodes of this type can be made to produce light having a nominal wavelength of 8,000 angstroms and having a bandwidth of about 200 angstroms. Such light is converted by the Nd:YAG rod into a laser output.

In a further embodiment of the laser, headers 11*a* include extensions 28 as illustrated in FIG. 5. Extensions 28 include reflecting surfaces 31 to provide additional reflected light energy in laser rod 25, thereby making the laser more efficient.

It should be understood that, although the embodiments and modifications of the invention are shown in the drawings and described in the text are preferred, the invention is capable of numerous variations. For example, each header assembly can support any convenient number of light-emitting members. The light-emitting members of each assembly can be connected either in series or in parallel or individually or in groups of series-connected diodes. The number of headers mounted on any particular support member is variable as is the number of diodes mounted on any of the headers. Preferable, the number of diodes mounted or committed to any header is optimized; that is, minimizing the number of good diodes committed to a header which are lost if one diode of the header is inoperable and, at the same time, maximizing the number of diodes per header. The light-emitting members comprising the various headers, header assemblies, or laser assemblies need not be of the same type and can vary in number. And, although trapezoidal prism-shaped headers and support members have been shown, the complementary headers and support members can be of any desired shape and can be arranged in any convenient manner. For example, the lower base of the support member can be curved rather than flat.

Thus, although specific embodiments of the invention have been illustrated in the drawings and described herein, it will be understood that the invention is not limited to the embodiments disclosed which are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed is:

1. An assembly for light-emitting members comprising:

a. a monolithic support member of thermally conductive material having a coolant passage therethrough;

b. a plurality of thermally conductive headers mounted in a substantially straight line on a surface of said support member; and c. a plurality of light-emitting members mounted in a single substantially straight line on each of said headers such that the light-emitting members of said plurality of headers are in a substantially straight line; wherein said assembly further includes:

i. a connector passageway in said support member, ii. a connector comprised of an electrically conductive material extending through said connector passageway, iii. means for electrically insulating the connector from said support member, and iv. means for electrically connecting at least some of the light-emitting members in series such that the light-emitting member at one end of the series is connected to the header and the light-emitting member at the other end of the series is connected to the connector.

2. The assembly according to claim 1 wherein said header is comprised of copper and said support member is comprised of brass.

3. The assembly of claim 2 including an adherent layer of solder between said headers and said surface of said support member, whereby said headers are joined securely to said support member.

4. The assembly of claim 3 wherein said adherent layer is comprised of gold.

5. An assembly for light-emitting members comprising:

a. a monolithic support member of thermally and electrically conductive material;

b. a plurality of thermally and electrically conductive headers mounted in a substantially straight line on a surface of said support member; and c. a plurality of light-emitting members mounted in a single substantially straight line on each of said headers such that the light-emitting members of said plurality of headers are in a single substantially straight line; wherein said assembly further includes:

i. a plurality of connector passageways in said support member;

ii. connectors comprised of an electrically conductive material one of such connectors extending through each of said connector passageways, and iii. means for electrically connecting groups of the light-emitting members in series such that the end light-emitting member of each series is selectively connected to one of said plurality of connectors and the other end light-emitting member of each series is connected to its respective header.

6. The assembly according to claim 5 wherein said header is comprised of copper and said support member is comprised of brass.

7. The assembly of claim 6 including an adherent layer of solder between said headers and said surface of said support member, whereby said headers are joined securely to said support member.

8. The assembly of claim 7 wherein said adherent layer is comprised of gold.

9. A semiconductor laser array comprising: a laser rod, and a plurality of trapezoidally-shaped modular assemblies for supporting a plurality of light-emitting members in optically pumping positions about the laser rod, each modular assembly including:

a. a truncated trapezoidally-shaped support member having a header attachment end and walls forming a cooling passage;

b. a plurality of trapezoidally-shaped headers shaped to form when combined together an apex for the truncated trapezoidally-shaped support member, each header having a light-emitting member attachment end surface opposite a base, said plurality of trapezoidally-shaped headers having their bases attached to the truncated trapezoidally-shaped support member to form the trapezoidally-shaped modular assembly; and c. a plurality of light-emitting members of which more than one are attached to each of said plurality of headers.

10. A laser according to claim 9, wherein said header is bonded to said support member by solder.

11. A laser according to claim 10, wherein said solder is comprised of gold.

12. A laser according to claim 11, wherein said header is comprised of copper, and said support member is comprised of brass.

13. A laser according to claim 9, wherein said assembly further includes:

a. a connector passageway in said support member;

b. an electrical conductor extending through said connector passageway; and c. means for electrically connecting at least some of the light-emitting members in series such that the light-emitting members at one end of the series is connected to the header and the light-emitting header at the other end of the series is connected to the connector.

14. A laser according to claim 9, wherein said each assembly is trapezoidally shaped, said support member being a truncated trapezoidally shaped member and said plurality of headers being complementary trapezoidally shaped members.

15. A laser according to claim 9, further including a light reflecting member having a shape compatible with the shape of the modular assembly and a light reflecting surface arranged to reflect non-absorbed light passing through the rod normal to its longitudinal axis back into the rod for further absorption.

16. A laser according to claim 15 wherein a plurality of said reflecting members are positioned together with a plurality of the modular assemblies about the laser rod.

17. A laser according to claim 9 wherein the light-emitting member attachment surface of each of said headers is bifurcated to provide a channel having a base to which the light-emitting members may be attached and side members, and reflectors on said side members for reflecting non-absorbed light into the laser rod.

18. A semiconductor laser comprising a laser rod, and means for supporting a plurality of light-emitting members in optically pumping positions about the surface of the laser rod and for supporting the laser rod, said means comprising:

a. a plurality of modular assemblies, each modular assembly including:

i a truncated trapezoidally-shaped support member having a header attachment end and walls forming a cooling passage;

ii a plurality of trapezoidally-shaped headers shaped to form when combined together an apex for the trapezoidally-shaped support member, each header having a light-emitting member attachment end surface opposite a base, said plurality of trapezoidally-shaped headers attached to the truncated trapezoidally-shaped support member to form a trapezoidally-shaped modular assembly; and iii a plurality of light-emitting members of which more than one are attached to each of said plurality of headers; and b a plurality of trapezoidally-shaped reflecting members having one end with a laser rod supporting and light reflecting surface, said plurality of modular assemblies and said plurality of light reflecting members being positioned about said laser rod so that reflective surfaces are opposite light-emitting members to reflect nonabsorbed light passing through the laser rod normal to its longitudinal axis back into the laser rod for absorption.

* * * * *